Patented Mar. 9, 1937

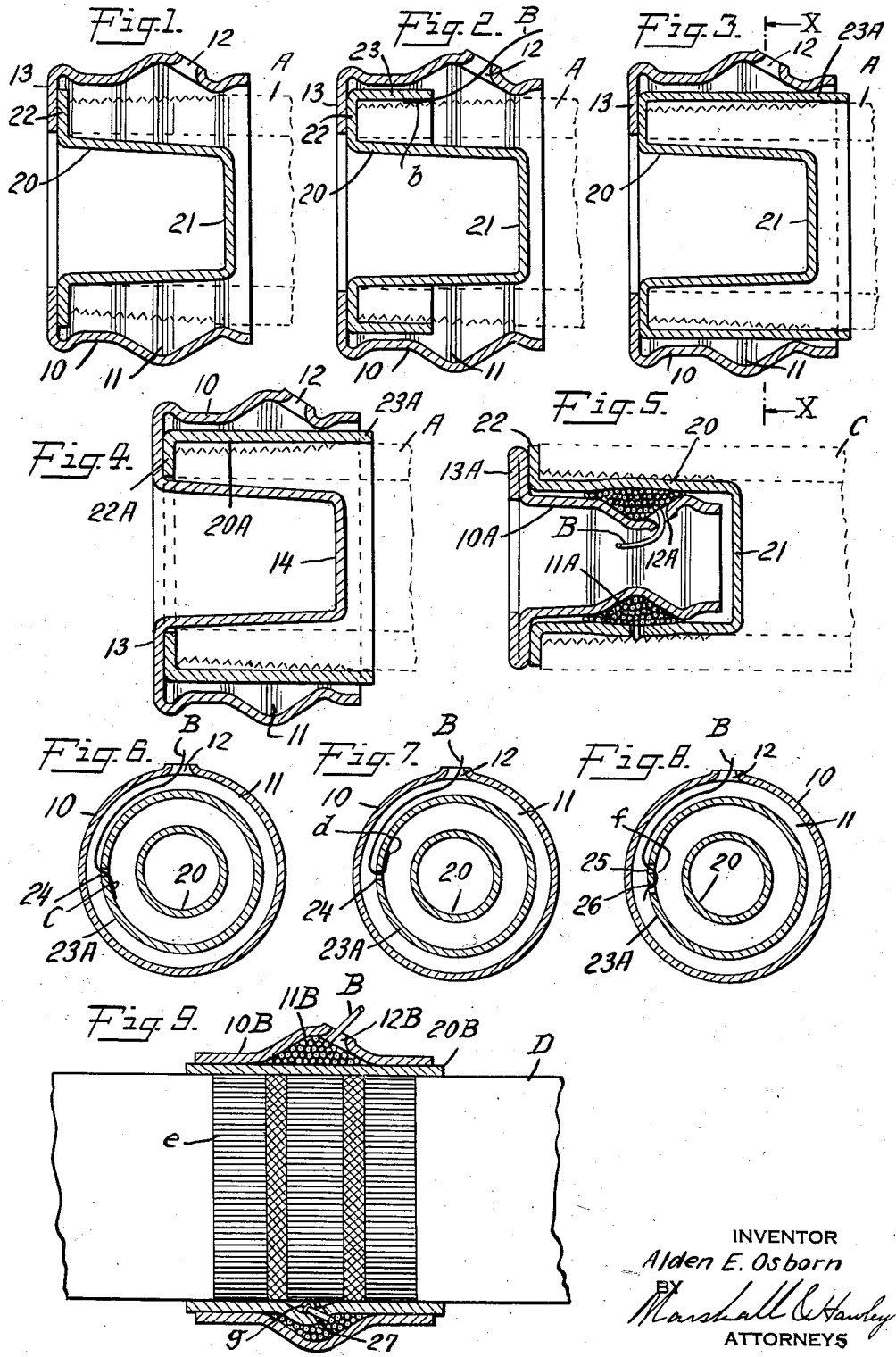

2,073,584

UNITED STATES PATENT OFFICE

2,073,584

PROTECTOR

Alden E. Osborn, New York, N. Y., assignor to Simplex Improvements, Inc., New York, N. Y., a corporation of Delaware Application September 13, 1935, Serial No. 40,393

7 Claims. (Cl. 138—96)

This invention relates to improvements in protectors, and more especially to the type of devices such as are shown in my Patent No. 1,949,431, issued March 6, 1934, and in my application Serial No. 741,061, filed August 23, 1934.

Its object is to provide with such devices, as an additional element, a liner which will increase their effectiveness. According to the present invention I provide a liner for the article which is to be protected. This liner may have a part extending between the end of the protected article and a flange at the outer end of the protector from which the liner may extend over the inner and/or the outer surfaces of the article. Its part which extends into the article may be closed to prevent foreign matter from entering the article. When used with a device which is affixed to the protected article by the interposition of a flexible element, the liner may be used to hold the end of the flexible element to the article.

Other objects will appear in the following specification.

Referring to the drawing,

Fig. 1 is a sectional elevation of a protector of the type shown in my aforesaid patent, applied to an externally threaded pipe which is indicated by dotted lines, with an interposed flanged cup-shaped liner;

Figs. 2 and 3 are similar views showing modifications of the liner;

Fig. 4 is a sectional elevation of a modified form of protector and a still further modified form of liner assembled on a pipe;

Fig. 5 is a sectional elevation of a protector for an internally threaded pipe, such as that shown in the aforesaid application, with a liner similar to that shown in Fig. 1, assembled on a pipe which is indicated by dotted lines;

Figs. 6, 7 and 8 are sectional end elevations of such an assembly as that shown in Fig. 3, illustrating different ways of utilizing the liner to hold a flexible retaining element to the pipe. The sections in these figures are taken on the line X—X of Fig. 3; and Fig. 9 is an elevation of a cylindrical member with a protector thereon and an interposed liner illustrating a somewhat different use of the invention.

In Figs. 1, 2, 3, 6, 7 and 8, a protector is shown which comprises a shell 10 adapted to surround a hollow cylindrical member, such as a pipe A. The shell is enlarged intermediate its length to form an annular channel 11 around the pipe. 12 is an orifice through which a flexible retaining element B may be introduced into this channel.

The outer end of the shell is bent inwardly to form a flange 13 which extends over the end of the pipe.

20 is a cup-shaped liner extending into the pipe. Its inner end 21 is closed and, as shown in Fig. 1, its outer end bent outwardly to form a flange 22 which is interposed between the end of the pipe A and the flange 13 of the protector. The body of the liner between its closed end 21 and its flange 22 is adapted to fit the inside of the pipe somewhat freely.

Before specifically describing the modification of this invention illustrated in the other figures of the drawing, I will point out the purpose and usefulness of the arrangement shown in Fig. 1. The threads of the pipe are effectively protected by such a cover as that shown in this figure, but it is desirable to close the ends of the pipe to prevent the ingress of foreign matter. If the flanges at the outer end of the protector are extended to form a flat closed end, the assembly is difficult to handle as the insertion of hooks or other implements into the pipe is precluded. The liner, extending as it does into the pipe, permits the insertion of desired implements and its closed end effectively seals the end of the pipe. Its flanged end 22 adds further protection to the end of the pipe.

In the modification shown in Fig. 2 the liner is extended from the outside of the flange 22, over the outside of the pipe to form a skirt 23. This still further protects the end of the pipe. It also stabilizes the protector and centralizes it while the flexible element B is being wound into the channel 11. Another advantage of this form of the device is that the end of the flexible element may be placed under the edge of the skirt or otherwise fastened thereto, as shown at b, to hold it against rotation relative to the pipe during the application of the protector.

In Fig. 3 the skirt 23A is extended beyond the inner end of the protector. In this case the flexible element will be wound around the outer surface of the liner and the liner will be pressed against or into the threads of the pipe. It is desirable to form the liner of deformable material, such as wood fiber or light gauge metal.

The latter function is performed by the liner 20A, shown in Fig. 4, which has a skirt 23A and an inwardly extending flange 22A. This is shown with a protector having a closed end 14 which extends into the pipe.

Fig. 5 illustrates a liner like that shown in Fig. 1 used with a protector for an internally threaded pipe C. This protector comprises a shell 10A having a channel 11A and an orifice 12A. Its flange 13A is formed of two layers by bending the end of the shell outwardly and inwardly, as shown. In this case the body of the liner between its closed end 21 and its flange 22 is pressed onto or into the threads of the pipe.

Figs. 6, 7 and 8 illustrate ways of anchoring the end of the flexible element to the pipe by means of the liner. In Figs. 6 and 7 the inner end of the skirt 23A is slotted, as at 24. In Fig. 6 the end of the flexible element B is passed through the slot 24 and down under the part of the skirt below the slot, as at c. In Fig. 7 the flexible element is passed through the slot and up under the part of the skirt above the slot, as at d.

In Fig. 8, perforations 25 and 26 are formed in the skirt 23A and the flexible element is passed through both of them, as shown at f. It is so obvious that the flexible element may be passed through a single perforation, such as 25, and its end knotted, that illustration of this simple modification is not necessary. Such an expedient is illustrated in Fig. 9 which will now be described.

This invention is applicable for protecting an intermediate part of a cylindrical member, such as that shown at D in Fig. 9. This may have an ornamental surface, as indicated at e, to be protected. A liner 20B is placed over this surface. Surrounding it is a shell 10B having a channel 11B and an orifice 12B. The liner is perforated, as at 27. The end of the flexible element B is shown as passed through this perforation and knotted, as at g.

This device is applied to the member D by winding the flexible element into the channel 11B by relative rotation between the member D and the shell 10B. The liner will be pressed against or into the ornamental surface e.

Several modifications of this invention have been shown and described. Others may be made without departing from its spirit and scope and I intend no limitations other than those imposed by the appended claims.

What I claim is:

1. The combination of a protector comprising a rigid cylindrical shell adapted to be placed adjacent a cylindrical surface of a member to be protected and a flange at one end of said shell, and a cup-shaped liner closed at one end, a flange at the other end and an intermediate cylindrical portion, the flange of the liner being adapted to be engaged by the flange of the protector to hold the liner in place.

2. The combination of a protector comprising a rigid cylindrical shell adapted to be placed adjacent a cylindrical surface of a member to be protected and a flange at one end of said shell, a cup-shaped liner closed at one end, a flange at the other end, an intermediate cylindrical portion, and a skirt concentrically spaced from said intermediate portion and connected therewith by the flange, the flange of the liner being adapted to be engaged by the flange of the protector to hold the liner in place.

3. The combination of a protector comprising a rigid cylindrical shell adapted to be placed adjacent a cylindrical surface of a member to be protected and a flange at one end of said shell, a cup-shaped liner closed at one end, a flange at the other end, an intermediate cylindrical portion, and a skirt concentrically spaced from said intermediate portion and connected therewith by the flange, said skirt being arranged to be interposed between the shell of the protector and an adjacent surface of a protected member, the flange of the liner being adapted to be engaged by the flange of the protector to hold the liner in place.

4. The combination of a protector comprising a rigid cylindrical shell adapted to be placed adjacent a cylindrical surface of a member to be protected and a flange at one end of said shell, a cup-shaped liner closed at one end, a flange at the other end, an intermediate cylindrical portion, and a skirt concentrically spaced from said intermediate portion and connected therewith by the flange, said skirt extending through the shell of the protector and being arranged to be interposed between said shell and an adjacent surface of a protected member, the flange of the liner being adapted to be engaged by the flange of the protector to hold the liner in place.

5. The combination with a rigid cylindrical shell adapted to be placed adjacent a cylindrical surface of a member, a flexible element arranged to affix the shell to the member by being wound between the shell with the member, and a liner interposed between the shell and the member and having said flexible element also wound around a part thereof.

6. The combination with a rigid cylindrical shell adapted to be placed adjacent a cylindrical surface of a member, and a flexible element arranged to affix the shell to the member by being wound between the shell with the member, and a liner interposed between the shell and the member, said liner being arranged to hold an end of the flexible element in non-rotative relation with the member.

7. The combination of a protector comprising a rigid cylindrical shell adapted to be placed adjacent a cylindrical surface of a member to be protected, a flange at one end of said shell, a flexible element arranged to affix the protector to the protected member by being wound between the shell and the member, and a liner having a flange arranged to be engaged by the flange of the protector to hold the liner in place and having a portion interposed between the shell and the member.

ALDEN E. OSBORN.